UNITED STATES PATENT OFFICE.

BYRAMJI D. SAKLATWALLA, OF BRIDGEVILLE, PENNSYLVANIA, ASSIGNOR TO THE AMERICAN VANADIUM CO., OF PITTSBURGH, PENNSYLVANIA, A CORPORATION OF NEW JERSEY.

PROCESS FOR RECOVERY OF VANADIUM.

1,020,312.  Specification of Letters Patent.  Patented Mar. 12, 1912.

No Drawing.  Application filed December 22, 1910. Serial No. 598,818.

*To all whom it may concern:*

Be it known that I, BYRAMJI D. SAKLATWALLA, of Bridgeville, in the county of Allegheny and State of Pennsylvania, have invented certain new and useful Improvements in Processes for the Recovery of Vanadium; and I do hereby declare the following to be a full, clear, and exact description of the invention, such as will enable others skilled in the art to which it appertains to make and use the same.

This invention relates to improvements in processes for extracting vanadium from ores.

The object of my present invention is to provide an efficient process for extracting vanadium from complex ores and to effectually divorce the vanadium from other metals and impurities which the ores may contain.

With this object in view, the invention consists in certain novel steps in the process of extracting vanadium from ores, as hereinafter set forth and pointed out in the claim.

The process is carried out substantially as follows: The ore, ground to about 60–80 mesh is treated with a suitable dissolving acid, preferably dilute sulfuric acid, 1:1, in a suitable vessel and the mass heated and agitated by steam. The solution thus obtained, containing all the vanadium and other soluble metals originally present in the ore, is decanted into a settling tank and thus separated from all insoluble gangue material. The solution after settling is pumped into a precipitating tank where it is boiled with steam and a calculated quantity of a strong oxidizing agent is added to it, which brings at first all the metals to their highest stage of oxidation and then on continued boiling causes precipitation of all the vanadium in the form of hydrated red oxid. As an oxidizing precipitating agent, I employ ammonium persulfate, $(NH_4)_2S_2O_8$. The precipitate will be separated from the supernatent liquid by filtration or decantation and washed to free it from the same. The washed precipitate will then be dried at a temperature sufficiently high to eliminate all hydrate water, thus leaving a product consisting of practically pure $V_2O_5$ which may be reduced to the metal by any preferred process of reduction.

Having fully described my invention what I claim as new and desire to secure by Letters-Patent, is,—

A process for extracting vanadium from complex ores, which consists in subjecting the ore to the action of a dissolving acid, and then treating the solution thus formed with ammonium persulfate to precipitate the vanadium as an oxid of vanadium free from all other metals contained in the solution.

In testimony whereof, I have signed this specification in the presence of two subscribing witnesses.

BYRAMJI D. SAKLATWALLA.

Witnesses:
JAMES C. GRAY,
JAS. A. HANNESY.